July 3, 1962
V. WILLIS
3,042,833
GAS DISCHARGE TUBES
Filed Dec. 28, 1959
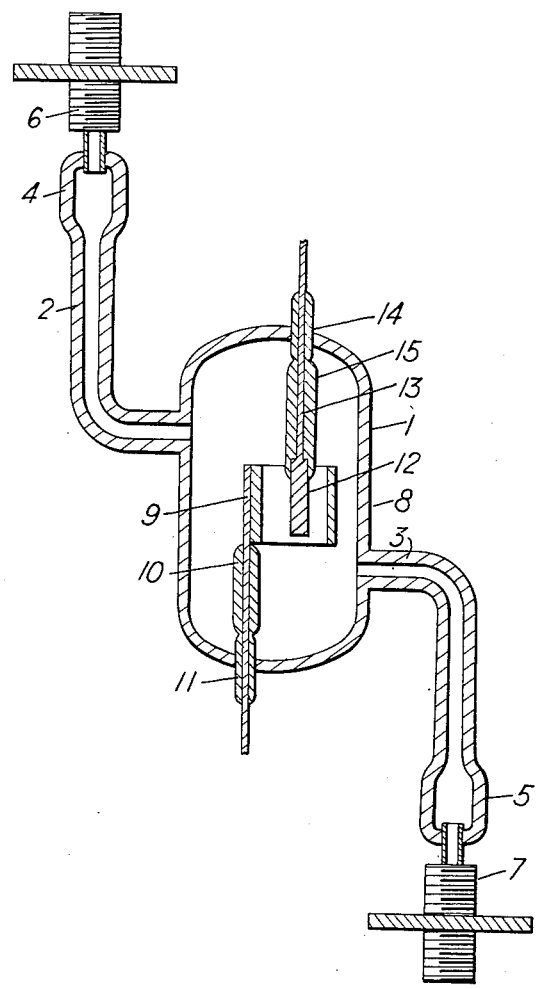
Inventor
VINCENT WILLIS
By
Cushman, Darby & Cushman
Attorneys 3,042,833
GAS DISCHARGE TUBES
Vincent Willis, Norton-on-Tees, England, assignor to Imperial Chemical Industries Limited, London, England, a corporation of Great Britain
Filed Dec. 28, 1959, Ser. No. 862,227
Claims priority, application Great Britain Dec. 29, 1958
1 Claim. (Cl. 315—111)

This invention relates to gas discharge tubes.

It has previously been proposed to employ a low pressure gas discharge tube as a gas detector, particularly for use in gas chromatography. When such a tube is operated in its normal glow region (i.e. that stable region of the tube's voltage/current characteristic where the burning voltage remains substantially constant on varying the discharge current), the voltage across the gaseous discharge depends on the nature of the gas present in the tube, and may change by several volts on introduction of a minute amount of impurity into the gas. Thus measurement of voltage fluctuations across the tube provides a method of detecting minute amounts of gas.

Gas discharge tubes are very sensitive, and it is said that they are capable of detecting quantities of gas too small to be detected by conventional methods of gas detection, such as for example those utilising the principle of variation of thermal conductivity of a gas with concentration of impurity contained in it. However, gas discharge tubes which have hitherto been used for the purpose of gas detection have several disadvantages, and in particular have poor linearity of response.

According to the present invention there is provided a gas discharge tube suitable for use as a gas detector, for example in gas chromatography, characterised in that it has a cathode comprising a cylindrical tubular member and, located substantially axially therein, an anode in the form of a rod, the space between the cathode and the anode being sufficient to permit reasonable gas flow between them, and yet not so great as to give rise to an unstable anode glow.

The anode preferably has a substantially circular and constant cross section.

Both the cathode and the anode may conveniently be made of platinum. This metal has the advantages that it does not readily become contaminated and can be chemically cleaned without its deteriorating.

The envelope of a gas discharge tube according to the present invention may conveniently be made of glass, which is an insulator and has the advantage of transparency. It is preferably made of a heat resistant glass which is easily worked.

Leads to the electrodes may conveniently be made of tungsten, and are preferably sealed into the glass envelope of the discharge tube through plugs of glass having a coefficient of expansion intermediate between that of tungsten and that of the envelope glass.

It is preferred that the electrode leads inside the discharge tube, and any portions of the cathode and anode which respectively do not form the cylindrical tubular member part of the cathode or are not surrounded by the cathode, should be covered by an insulating material, for example glass. Such insulation prevents spurious discharges which may cause non-linearity of response when the tube is used as a gas detector.

A gas discharge tube according to the present invention preferably has an inlet and an outlet tube, whereby gas may be passed through the discharge tube. This type of apparatus may be used for detection of a gas or vapour in a continuous stream of carrier gas.

A suitable volume for the gas discharge tube is, for example, 2 to 3 ml.

Also according to the invention there is provided a method of gas detection comprising introducing into a gas discharge tube as hereinbefore defined a sample of a gas to be detected, operating the said tube in the normal glow region of its characteristic, and measuring the change in voltage across the tube caused by the presence of the said gas.

The invention also provides a method of detecting gases in a stream of carrier gas, comprising passing the said stream through a gas discharge tube as hereinbefore defined having an inlet and an outlet tube, operating the said discharge tube in the normal glow region of its characteristic and measuring the resulting variations in voltage across the said tube.

According to a particular form of the invention there is provided a method of gas detection comprising passing a carrier gas through a gas discharge tube as hereinbefore defined having an inlet and an outlet tube, passing through an identical tube a similar stream of carrier gas containing a sample to be detected, operating the two tubes in the normal glow regions of their characteristics and under identical conditions, and measuring the difference between the voltage across each of the tubes.

A gas discharge tube according to the present invention provides an even, stable glow, has excellent sensitivity as a gas detector, and gives a linear relationship between the burning voltage and the concentration of the gas to be detected within the tube.

For the better understanding of the invention a specific embodiment thereof will now be described with reference to the drawing accompanying this specification. This drawing is a longitudinal section of a gas discharge tube having a capacity of 2 to 3 ml.

The gas discharge tube comprises an envelope 1 fitted with inlet and outlet tubes 2 and 3 whereby gas may be passed through the apparatus. The envelope and inlet and outlet tubes are made of heat resistant glass. Tubes 2 and 3 are joined by glass-metal seals 4 and 5 to externally screw threaded tubes 6 and 7 which may be connected to a vacuum pump and gas circulation system.

The cathode is in the form of a cylindrical platinum tube 8, and is joined to a tungsten lead 9 covered with glass insulation 10, and sealed through the wall of the envelope 1 by means of a plug 11 of a sealing glass having a coefficient of expansion intermediate between that of tungsten and that of the envelope glass.

The anode is in the form of a cylindrical platinum rod 12 axially disposed within the annular cathode. The anode is joined to a tungsten lead 13 which is sealed through the wall of the envelope 1 by means of a plug 14 of a sealing glass of the type described above. This lead and part of the platinum rod 12 are covered with glass insulation 15, so that the only exposed part of the anode is wholly within the cylindrical tube 8.

The gas discharge tube described above, when operated in the normal glow region of its characteristic is particularly suitable for use as a gas detector in gas chromatography. It may conveniently be operated at an absolute pressure of about 4 mm. of mercury, with a voltage of about 300 volts across the electrodes. A carrier gas is passed through the tube, containing compounds eluted from a chromatographic column, and the voltage fluctuations are measured by means of a recording potentiometer. By this means it is possible to detect quantities of gas of the order of $10^{-11}$ mole, which represents a sensitivity of about $10^4$ times that of the more conventional types of gas detectors utilising the principle of change in thermal conductivity with concentration of impurity in a gas.

I claim:

A gas discharge tube suitable for use as a gas detector, comprising in combination a glass envelope having an inlet and an outlet tube, a cathode comprising a substantially cylindrical tubular member made of platinum, a platinum anode in the form of a rod of substantially circular and constant cross section located substantially axially within the said tubular member, the space between the cathode and the anode being sufficient to permit reasonable gas flow between them, and yet not so great as to give rise to an unstable anode glow, and tungsten leads to the electrodes, which leads are sealed into the glass envelope through plugs of glass having a co-efficient of expansion intermediate between that of tungsten and that of the envelope glass, the electrode leads inside the discharge tube, and any portions of the cathode and anode other than the cylindrical tubular member part of the cathode and the part of the anode which is surrounded by the cathode, are covered by an insulating material.

References Cited in the file of this patent

UNITED STATES PATENTS

| | | |
|---|---|---|
| 2,550,498 | Rice | Apr. 24, 1951 |
| 2,581,970 | Partiot | Jan. 8, 1952 |
| 2,728,877 | Fischer | Dec. 27, 1955 |
| 2,854,625 | Dudley | Sept. 30, 1958 |
| 2,933,676 | Stokes | Apr. 19, 1960 |